(12) United States Patent
Wang et al.

(10) Patent No.: US 12,248,152 B1
(45) Date of Patent: Mar. 11, 2025

(54) ADJUSTABLE HEAD SECUREMENT FOR HEAD-MOUNTABLE DEVICE

(71) Applicant: Apple Inc., Cupertino, CA (US)

(72) Inventors: Paul X Wang, Cupertino, CA (US); Scott M. Leinweber, Sunnyvale, CA (US); John S. Camp, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 537 days.

(21) Appl. No.: 17/740,199

(22) Filed: May 9, 2022

Related U.S. Application Data

(60) Provisional application No. 63/186,724, filed on May 10, 2021.

(51) Int. Cl.
 *G02B 27/01* (2006.01)
(52) U.S. Cl.
 CPC ................................. *G02B 27/0176* (2013.01)
(58) Field of Classification Search
 CPC .................................................. G02B 27/0176
 USPC ............................................................ 359/13
 See application file for complete search history.

(56) References Cited

U.S. PATENT DOCUMENTS

| | | |
|---|---|---|
| 2016/0100237 A1 | 4/2016 | Blouse |
| 2016/0216512 A1 | 7/2016 | Miller et al. |
| 2016/0299346 A1 | 10/2016 | Allin et al. |
| 2018/0055202 A1* | 3/2018 | Miller ................ G02B 27/0176 |

* cited by examiner

*Primary Examiner* — Wyatt A Stoffa
*Assistant Examiner* — Mitchell T Oestreich
(74) *Attorney, Agent, or Firm* — BAKERHOSTETLER

(57) ABSTRACT

Systems of the present disclosure can provide a head-mountable device with a head securement element that allows a user to adjust how the head securement element fits near the ears of the user. Examples of adjustment mechanisms described herein allow a user to control the size, shape, flexibility, and/or position of certain regions of the head securement element with respect to the ears of the user. Accordingly, the user can select a configuration that distributes forces evenly, maximizes comfort, and allows the user to enjoy the head-mountable device for longer durations of time.

20 Claims, 10 Drawing Sheets

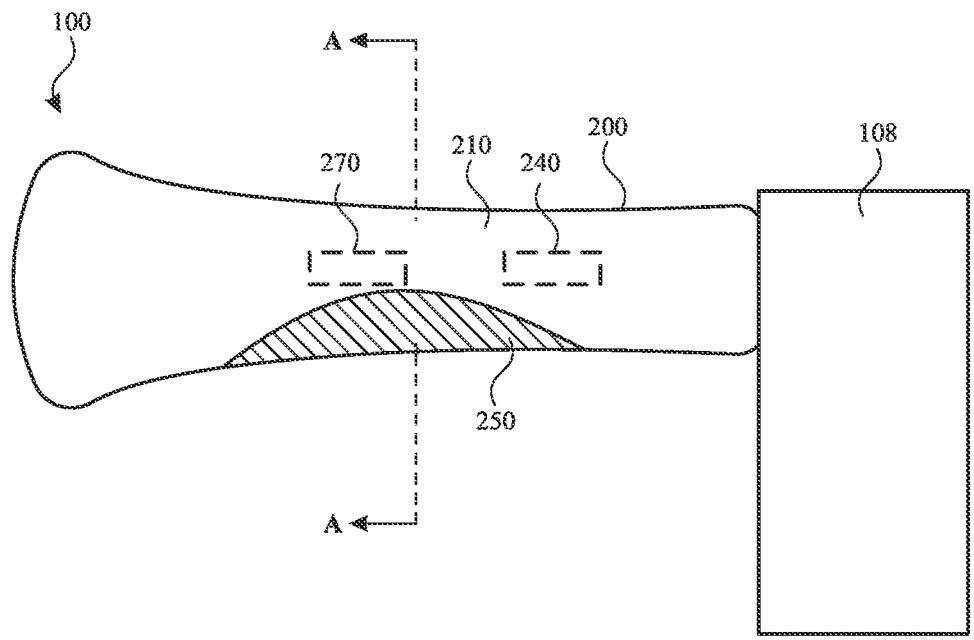
FIG. 3
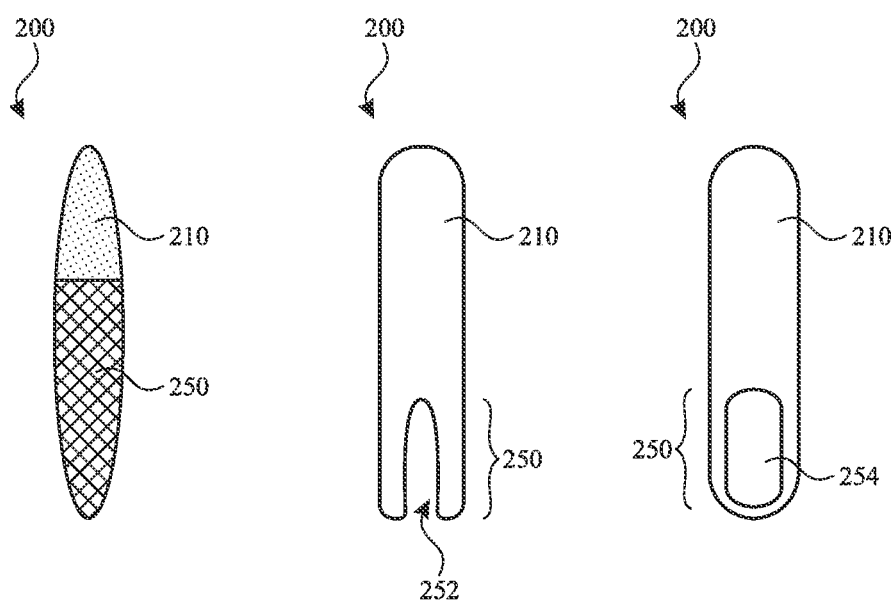
FIG. 4  FIG. 5  FIG. 6

ADJUSTABLE HEAD SECUREMENT FOR HEAD-MOUNTABLE DEVICE

CROSS-REFERENCE TO RELATED APPLICATIONS

This application claims the benefit of U.S. Provisional Application No. 63/186,724, entitled "ADJUSTABLE HEAD SECUREMENT FOR HEAD-MOUNTABLE DEVICE," filed May 10, 2021, the entirety of which is incorporated herein by reference.

TECHNICAL FIELD

The present description relates generally to head-mountable devices, and, more particularly, to adaptable head securement mechanisms for securing a head-mountable devices to a head of a user.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

FIG. 3 illustrates a side view of a head-mountable device, according to some embodiments of the present disclosure.

FIG. 4 illustrates a cross-sectional view of the head securement element of the head-mountable device of FIG. 3 taken along line A-A, according to some embodiments of the present disclosure.

FIG. 5 illustrates a cross-sectional view of an alternate head securement element of the head-mountable device of FIG. 3 taken along line A-A, according to some embodiments of the present disclosure.

FIG. 6 illustrates a cross-sectional view of an alternate head securement element of the head-mountable device of FIG. 3 taken along line A-A, according to some embodiments of the present disclosure.

DETAILED DESCRIPTION

Figure 1:
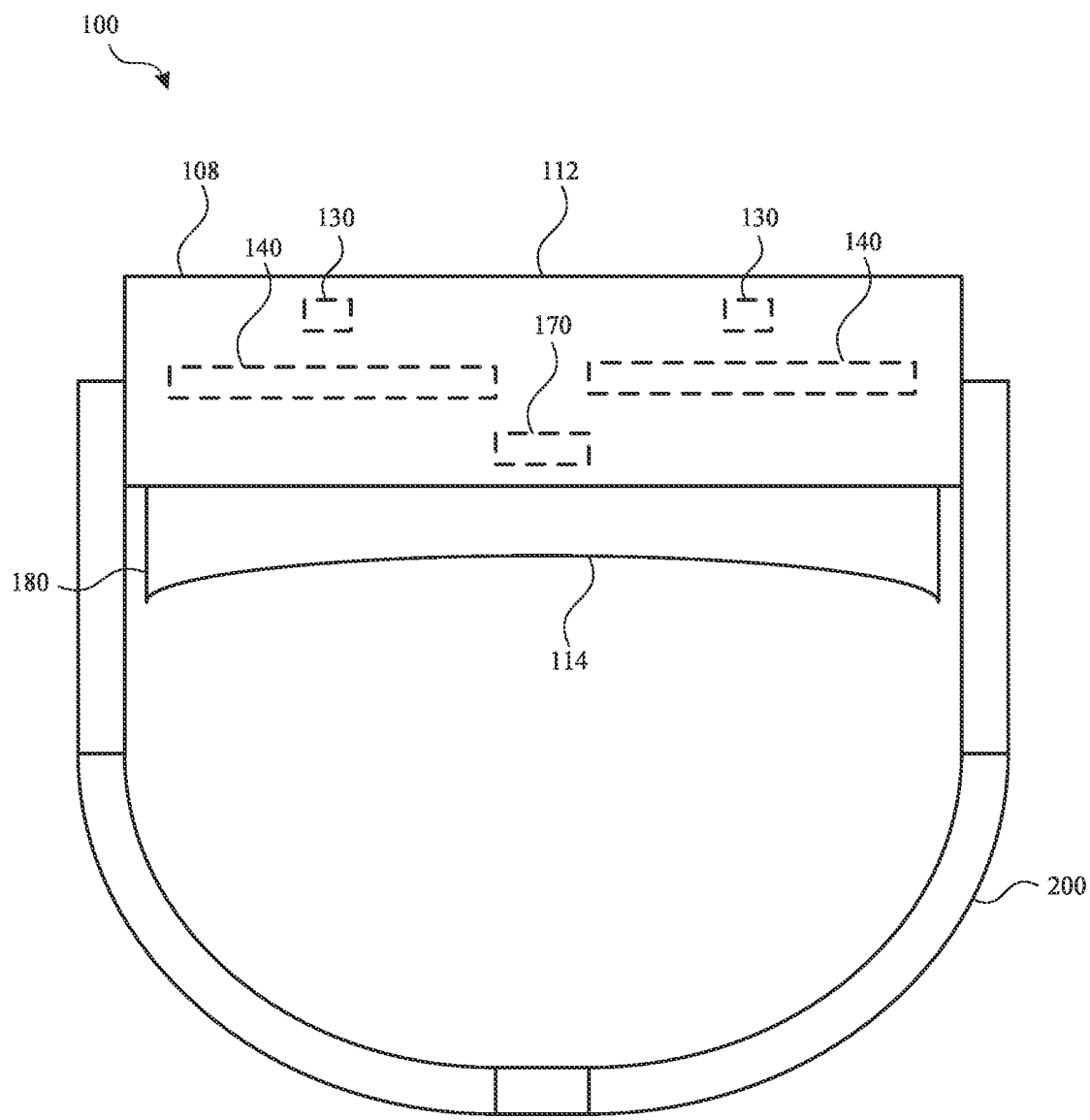
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

A head-mountable device can be secured to a head of a user while being worn and operated by the user. It can be desirable to maximize the fit and comfort on the user, so that usage of the head-mountable device for extended durations is not difficult for the user.

Some head-mountable devices are designed to secure to the head of the user by wrapping tightly around the sides and/or back of the user's head, for example, with arms or a band. This arrangement often involves providing a tightness that can secure the head-mountable device to a variety of head shapes and sizes. However, this can be somewhat uncomfortable for at least some users.

To maximize comfort experienced by the user, a head-mountable device can provide one or more different types of adjustment capabilities. Such adjustments can help accommodate portions of the user's head, including the user's ears. While different users have ears in different locations and of different sizes, it can be beneficial to provide adjustment capabilities to avoid placing excessive forces on the ears of the user while maintaining a secure fit. Such adjustment capabilities can help distribute forces and accommodate variations in head features (e.g., ear size, shape, and location relative to other features of the head) across different users.

It can be desirable to provide a head securement element that allows a user to adjust how the head securement element fits near the ears of the user. Examples of adjustment mechanisms described herein allow a user to control the size, shape, flexibility, and/or position of certain regions of the head securement element with respect to the ears of the user. Accordingly, the user can select a configuration that distributes forces evenly, maximizes comfort, and allows the user to enjoy the head-mountable device for longer durations of time.

These and other embodiments are discussed below with reference to FIGS. 1-19. However, those skilled in the art will readily appreciate that the detailed description given herein with respect to these Figures is for explanatory purposes only and should not be construed as limiting.

As shown in FIG. 1, a head-mountable device 100 can include an HMD module 110, a face engagement module 180, and a head securement element 200. The HMD module 110 can include a frame 108 that is worn on a head of a user. The frame 108 can be positioned in front of the eyes of a user to provide information within a field of view of the user. The HMD module 110 and/or the face engagement module 180 can provide a nosepiece to rest on a user's nose.

The frame 108 can provide structure around a peripheral region thereof to support any internal components of the HMD module 110 in their assembled position. For example, the frame 108 can enclose and support various internal components (including for example integrated circuit chips, processors, memory devices and other circuitry) to provide computing and functional operations for the head-mountable device 100, as discussed further herein. While several components are shown within the frame 108 of the HMD module 110, it will be understood that some or all of these components can be located anywhere within or on the head-mountable device 100. For example, one or more of these components can be positioned within the face engagement module 180, the arms 190, and/or the head securement element 200 of the head-mountable device 100.

The frame 108 can include and/or support one or more camera modules 130. The camera modules 130 can be positioned on or near an outer side 112 of the frame 108 to capture images of views external to the head-mountable device 100. As used herein, an outer side of a portion of a head-mountable device is a side that faces away from the user and/or towards an external environment. The captured images can be used for display to the user or stored for any other purpose. Each of the camera modules 130 can be movable along the outer side 112. For example, a track or other guide can be provided for facilitating movement of the camera module 130 therein.

The head-mountable device 100 can include display elements 140 that provide visual output for viewing by a user wearing the head-mountable device 100. One or more display elements 140 can be positioned on or near an inner side 114 of the frame 108. As used herein, an inner side 114 of a portion of a head-mountable device 100 is a side that faces toward the user and/or away from the external environment.

A display element 140 can transmit light from a physical environment (e.g., as captured by a camera module) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set and/or changed based on an interpupillary distance ("IPD") of the user. IPD is defined as the distance between the centers of the pupils of a user's eyes.

The HMD module 110 and/or the face engagement module 180 can include a sensor 170. The sensor 170 can be positioned and arranged to detect a characteristic of the user, such as facial features. For example, such a user sensor can perform facial feature detection, facial movement detection, facial recognition, eye tracking, user mood detection, user emotion detection, voice detection, and the like.

The face engagement module 180 can define an interior space through which light can pass, thereby providing to the user wearing the head-mountable device a view of a display element of the HMD module 110. Such a view can be enhanced by preventing the ingress of light from the external environment and into the face engagement module 180. To provide an effective face engagement, a comfortable fit, and proper alignment of the HMD module 110, the face engagement module 180 can be customized and/or selected for a particular user. As such, a given HMD module 110 can be used with various users where each user is provided with an appropriate face engagement module 180 that provides the desired fit.

While the face engagement module 180 is shown schematically with a particular size and shape, it will be understood that the size and shape of the face engagement module 180, particularly at the inner side 114 of the face engagement module 180, can have a size and shape that accommodates the face of a user wearing the head-mountable device 100. For example, the inner side 114 can provide a shape that generally matches the contours of the user's face around the eyes of the user. The inner side 114 can be provided with one or more features that allow the face engagement module 180 to conform to the face of the user to enhance comfort and block light from entering the face engagement module 180 at the point of contact with the face. For example, the inner side 214 can provide a flexible, soft, elastic, and/or compliant structure.

As further shown in FIG. 1, the head-mountable device 100 can include a head securement element 200, such as a band, extending from opposing sides of the HMD module 110. For example, the frame 108 of the HMD module 110 can be connected to and/or integrally formed with the head securement element 200. The head securement element 200 can form a band or other structure that extends continuously between and to each of the opposing sides of the HMD module 110. The head securement element 200, forming a band, can extend to and/or about a rear side of the head of the user. Such a band can be stretchable to comfortably provide tension about the head of the user. For example, the band can include fabric, elastic, polymers, woven materials, braided materials, and the like, as described further herein.

Figure 2:
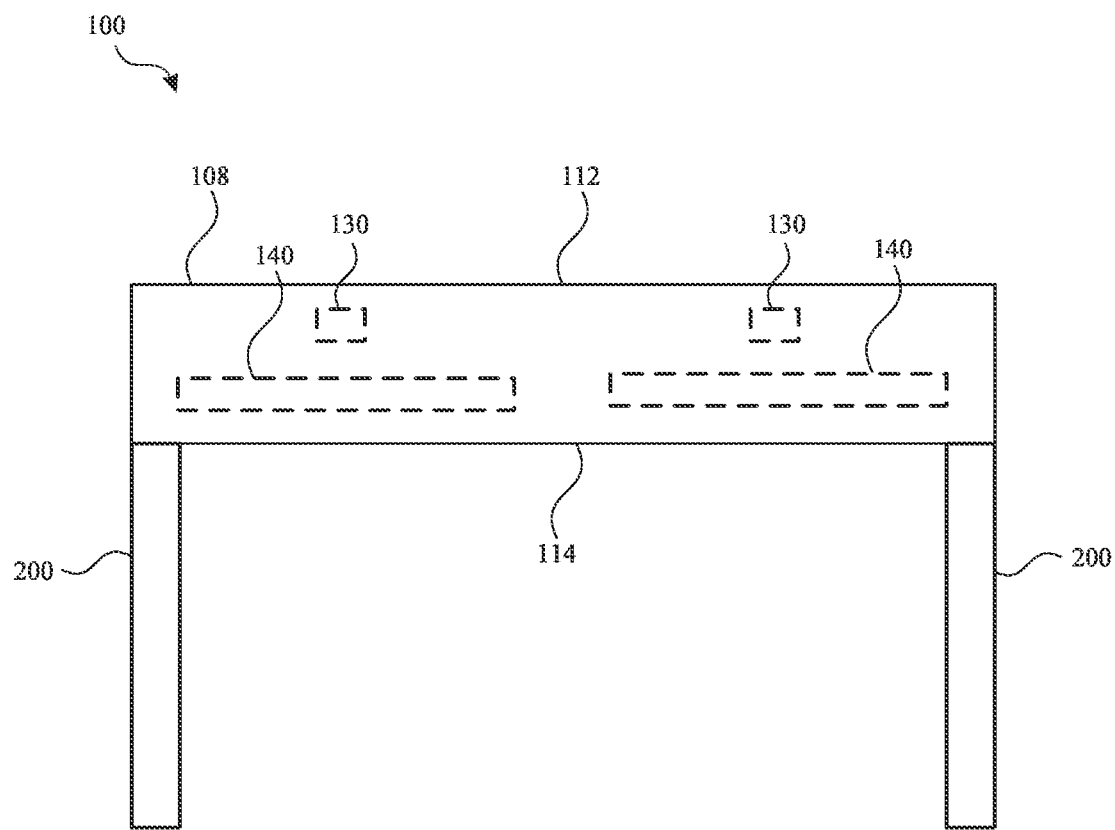
FIG. 2 illustrates a top view of another head-mountable device, according to some embodiments of the present disclosure.

While the head securement elements 200 of FIGS. 1 and 2 are illustrated as being connected directly to the frame 108, it will be understood the head securement element(s) 200 may be connected to the frame 108 via the face engagement module 180, where provided. By providing the head securement element 200 with a face engagement module 180, both head securement and face engagement can be customized or otherwise selected for achieving the desired fit for a given user. It will be further understood that the head securement element 200 can optionally be directly connected to both the HMD module 110 and the face engagement module 180.

Referring now to FIG. 2, a head-mountable device can be secured to a head of a user with one or more other types of head securement elements. For example, as shown in FIG. 2, a head-mountable device 100 can include a frame 108 that is worn on a head of a user. The frame 108 can support one or more camera modules 130, one or more display elements 140, and/or other components.

As further shown in FIG. 2, the head-mountable device 100 can include head securement elements 200, such as arms, extending from the frame 108 on opposing sides thereof. For example, the head securement elements 200, as arms, can extend from and/or be integrally formed with the frame 108. The head securement elements 200 and the frame 108 can form a continuous, rigid structure or be moveable relative to each. For example, a portion of each of the head securement elements 200 can be pivotably coupled to the frame 108 of the head-mountable device 100 for collapsing into a stowed configuration.

It will be appreciated that other configurations can be applied for securing the head-mountable device 100 to a user's head. For example, one or more straps, belts, caps, hats, nets, or other components can be used in addition to or in place of the illustrated components of the head-mountable device 100.

Referring now to FIGS. 3-6, a head securement element can comfortably secure the head-mountable device to a head of a user by adapting to accommodate the ears of the user.

As shown in FIG. 3, the head securement element 200 can wrap or otherwise extend along opposing sides of a user's head and optionally to a rear of the user's head. The head securement element 200 can include earpieces for wrapping around or otherwise engaging or resting on a user's ears. For example, the head securement element 200 can include a body 210 that defines a greater part of the head securement element 200 (e.g., extending between ends thereof). The head securement element 200 can further include a deformable region 250 that is configured to be positioned at or near a location of the ears of the user while the head-mountable device 100 is worn. The deformable region 250 can be part of the body 210 or adjacent thereto. The deformable region 250 can define an edge of the body 210 and/or the head securement element 200, such that the deformable region 250 is the portion of the head securement element 200 that is closest to and/or contacts the ear of the user. As such, the deformable region 250 can form a recess or otherwise be shaped to match the contours of the ear and surrounding anatomy so that the head securement element 200 can comfortably rest on or near the ears to secure the head-mountable device 100 to the head of the user. While the deformable region 250 comfortably interacts with or near the ears, the body 210 can provide clamping forces in front of, over, and/or behind the ears of the user by providing a degree of tension along its length.

As further shown in FIG. 3, the head securement element 200 can include one or more electronic components 240 to provide functions at or near the sides of the head of the user. Such electronic components 240 can provide functions at particular locations and/or be operably connected to other components of the head-mountable device 100 (e.g., in the frame 108). An electronic component 240 can include output components, such as a speaker positioned to direct sound to the ears of the user. By further example, the electronic component 240 can include an input component, such as a touch input or microphone. Such electronic components 240 can optionally be supported by the body 210 of the head securement element 200.

Additionally or alternatively, a sensor 270 can be provided to detect the interaction between the head securement element 200 and the head. For example, a sensor 270 can be provided to detect a magnitude of force applied to or near the ear of the user. In response to a detected force, the head-mountable device 100 can provide an indication to a user regarding the detection. By further example, the head-mountable device 100 can actively adjust a fit of the head securement element 200 (e.g., by operation of an adjustment element and/or a biasing element). By further example, the head-mountable device 100 can provide an indication to an external system regarding the fit of the head securement element 200, such as during a fitting operation to determine a customized component for a particular user.

In some embodiments, the body 210 and/or the deformable region 250 can be formed from a polymer, such as a fluoroelastomeric polymer, silicone, FKM, or another polymer, such as those having a Shore durometer selected for having flexibility suitable for easily contouring to a user's ears while maintaining sufficient stiffness to maintain support of the head-mountable device 100 when worn on the head of the user. For example, the body 210 and/or the deformable region 250 can each have a particular Shore durometer. It will be understood that the deformable region can be more deformable than the body 210. As used herein, a structure is more deformable when it yields (e.g., adapts its shape and/or size) more readily under the influence of an external force. Such forces can tend to deform, compress, deflect, stretch, bend, flex, or twist the structure to which they are applied.

It will be understood that the aspect of being deformable can result from the material selection of the structure. For example, as shown in FIG. 4, the deformable region 250 can be of a material that is more deformable (e.g., having a lower Shore durometer) than a material of the body 210. The difference in material can provide different performance characteristics, such as deformability and responsiveness to external forces.

It will be further understood that the aspect of being deformable can result from the construction and/or arrangement of the structure. For example, the deformable region 250 can form a structure that is thinner than a structure of the body 210. By further example, the deformable region 250 can form a weave, braid, mesh, or other arrangement that provides relative movement between constituent parts. In contrast, the body 210 can have fewer degrees of movement between constituent parts and/or form a monolithic structure.

For example, as shown in FIG. 5, the deformable region 250 can form separate portions that are separated by a gap 252. The gap 252 can provide relative movement of the portions of the deformable region 250 to provide enhanced deformability. It will be understood that such portions of the deformable region 250 can optionally extend continuously from (e.g., be monolithically formed with and/or of the same material as) the body 210.

By further example, as shown in FIG. 6, the deformable region 250 can form an enclosed void 254. The void 254 can provide relative movement of the portions of the deformable region 250 to provide enhanced deformability. It will be understood that such portions of the deformable region 250 can optionally extend continuously from (e.g., be monolithically formed with and/or of the same material as) the body 210.

Figure 7:
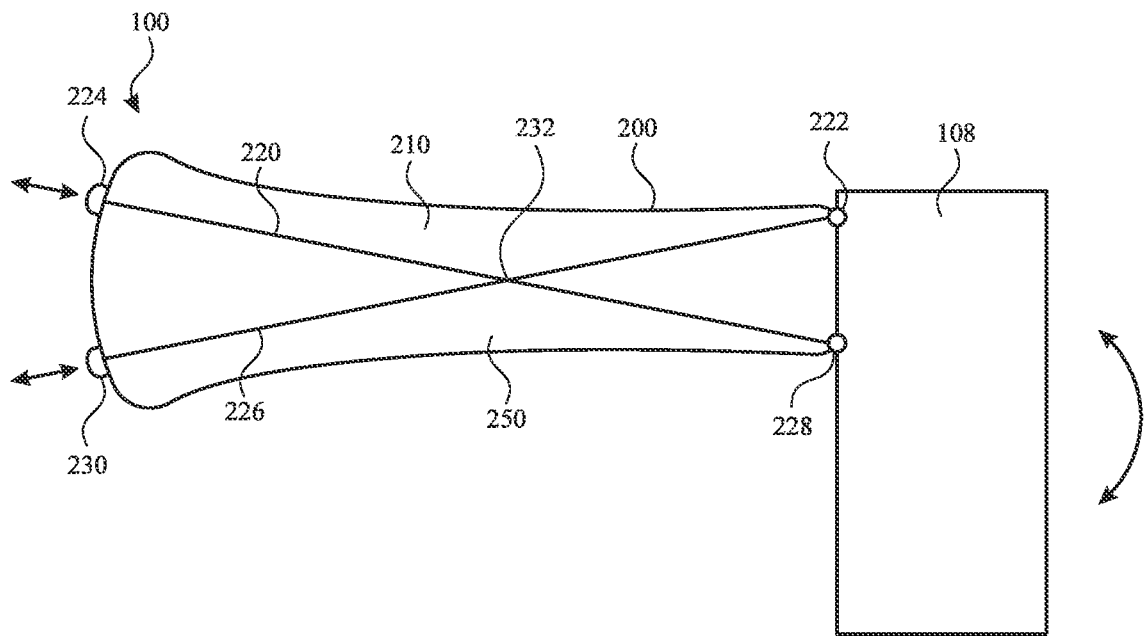
FIG. 7 illustrates a side view of a head-mountable device, according to some embodiments of the present disclosure.
Figure 8:
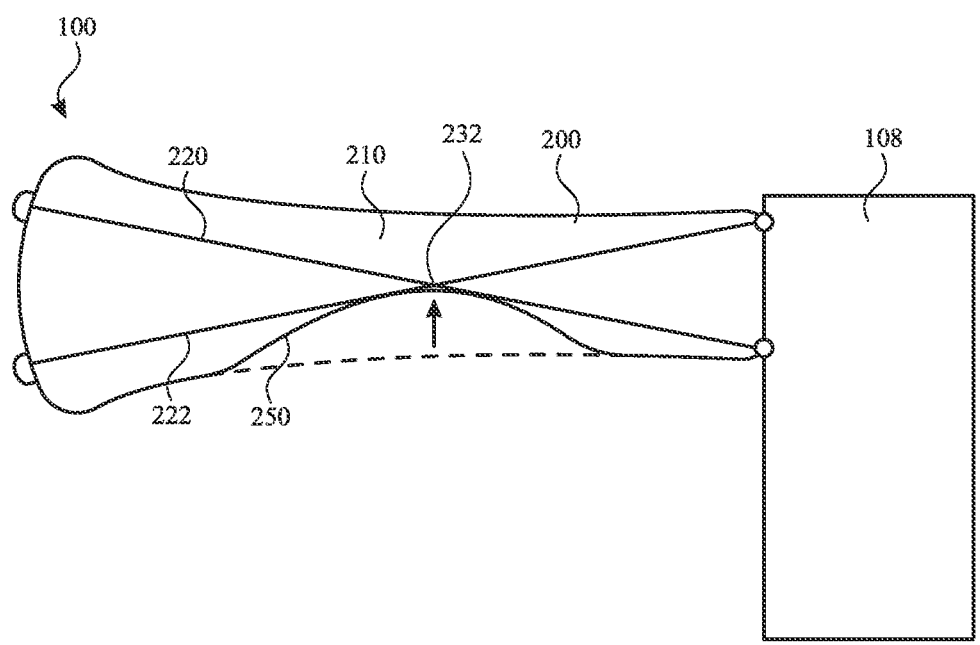
FIG. 8 illustrates a side view of the head-mountable device of FIG. 7, according to some embodiments of the present disclosure.

Referring now to FIGS. 7 and 8, a head securement element can include tensioning elements that provide deformability at regions that may interact with or near the ears of the user. In addition to enhancing user comfort, such tensioning elements can provide adjustability of both the magnitude of forces applied to the face of the user as well as the tilt of the head-mountable device for controlling the distribution of the forces evenly across the face of the user.

As shown in FIG. 7, the head securement element 200 of the head-mountable device 100 can include multiple straps (e.g., support strap 220 and/or tilt strap 226). Each strap can optionally have their own adjustment capability so that different types of adjustments can be independently controlled. Each of the straps can couple to different locations of the frame 108 and extend about different regions of the head 10 of the user.

As shown in FIG. 7, a support strap 220 can extend from the frame 108 and extend about an upper portion of the head 10 of the user. The support strap 220 can include support strap engagement elements 228 that are coupled to the frame 108 at corresponding first locations. The support strap 220 can include a support strap tensioning element 224 configured to adjust tension in the support strap 220. For example, the support strap tensioning element 224 can be operated to alter an effective length of the support strap 220 (e.g., the length between the support strap engagement elements 228). Such adjustments can be manual (e.g., by the user) and/or automated (e.g., controlled by the head-mountable device 100). The support strap tensioning element 224 can be operated to adjust the tension in the support strap 220. When tension is increased, the frame 108 can be pulled toward the face of the user.

As further shown in FIG. 7, a tilt strap 226 can extend from the frame 108 and extend about a lower portion of the head 10 of the user. The tilt strap 226 can include tilt strap engagement elements 222 that are coupled to the frame 108 at corresponding second locations. The second locations can be different than the first locations at which the support strap engagement elements 228 are positioned. The tilt strap 226 can include a tilt strap tensioning element 230 configured to adjust tension in the tilt strap 226. For example, the tilt strap tensioning element 230 can be operated to alter an effective length of the tilt strap 226 (e.g., the length between the tilt strap engagement elements 222). Such adjustments can be manual (e.g., by the user) and/or automated (e.g., controlled by the head-mountable device 100). The tilt strap tensioning element 230 can be operated to adjust the tension in the tilt strap 226. When tension is increased, the frame 108 can be tilted (e.g., rotated) about a fulcrum, such as regions of the user's face (e.g., nose and cheeks) on which the frame 108 rests and applies a portion of its weight.

As shown, the support strap 220 can extend from support strap engagement elements 228 positioned at a lower location on the frame 108 and about an upper region of the head of the user to provide forces with an upward component. In contrast, the tilt strap 226 can extend from tilt strap engagement elements 222 positioned at an upper location on the frame 108 and about a lower region of the head of the user to provide forces with a downward component and/or torque to tilt the frame 108 toward or away from the forehead of the user's head. The position of the tilt strap engagement elements 222 can facilitate the application of torque to provide the desired tilt. As such, the support strap 220 and the tilt strap 226 can cross each other at one or more intersections 232 along their lengths and/or as they extend about the head of the user.

As further shown in FIGS. 7 and 8, a deformable region 250 can be formed adjacent to the intersection 232 and along an edge of the head securement element 200. For example, the support strap 220 and the tilt strap 226 can be held in tension while the user wears the head-mountable device 100. Accordingly, the support strap 220 and the tilt strap 226 can add rigidity and hardness to the head securement element 200. However, the deformable region 250 can be formed at a portion of the head securement element 200 that has a relatively large distance from the edge to the intersection 232, as compared to the distances from the edge to other portions of either the support strap 220 or the tilt strap 226.

Accordingly, as shown in FIG. 8, the deformable region 250 can alter its shape and/or size as it deforms towards the intersection 232. At some portions of the deformable region 250, the extent of deformation may be limited by the presence of the support strap 220 and/or the tilt strap 226. Nonetheless, the available deformation provided by the crossing arrangement of the support strap 220 and the tilt strap 226 can correspond to a deformable shape that accommodates the ear of the user.

Figure 9:
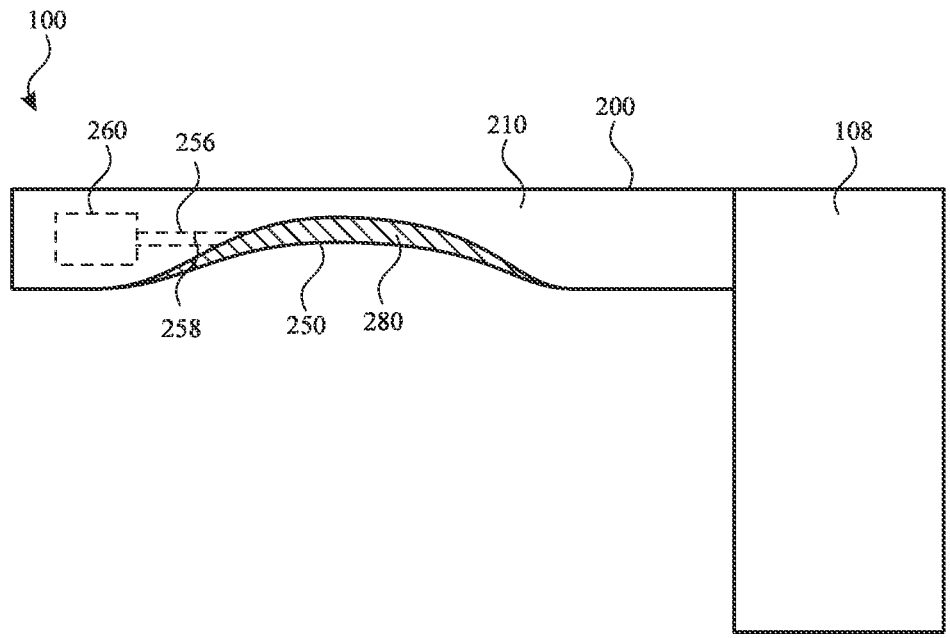
FIG. 9 illustrates a side view of a head-mountable device, according to some embodiments of the present disclosure.
Figure 10:
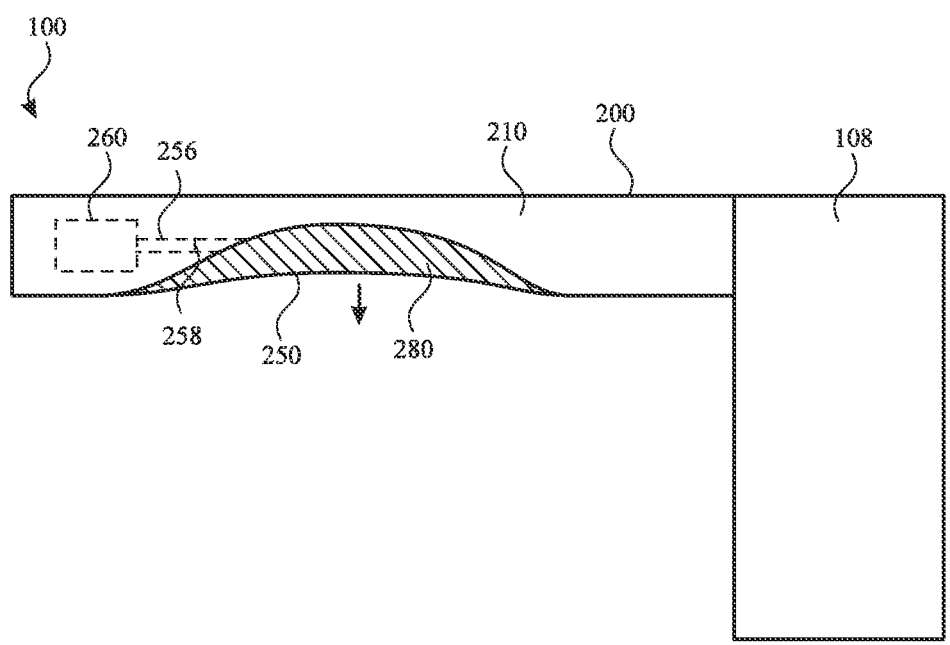
FIG. 10 illustrates a side view of the head-mountable device of FIG. 9 forming a flexible or deformable region, according to some embodiments of the present disclosure.

Referring now to FIGS. 9 and 10, a head securement element can include a pump-activated expandable chamber for adjusting a size and/or shape of the head securement element to accommodate a user.

As shown in FIG. 9, the head securement element 200 of the head-mountable device 100 can include a deformable region 250 that defines an expandable chamber 280. The expandable chamber 280 can extend from a body 210 of the head securement element 200. The expandable chamber 280 can be filled or fillable with a fluid or other substance that can be provided to and/or removed from the expandable chamber 280 as desired. The walls of the expandable chamber 280 can stretch to increase the internal capacity thereof, as well as the outer surface area for engaging the head of the user.

The deformable region 250 can be controlled by a pump 260 that is connected to the expandable chamber 280 by a line 256. The pump 260 can be operated manually (e.g., by the user) or electronically (e.g., by the head-mountable device). Where the pump 260 is manually operated, the pump 260 can contain a fluid and be compressed by applying a force thereto (e.g., with finger(s) of the user).

As shown in FIG. 10, the compression of the pump 260 can inject fluid through the line 256 and/or a valve 258 contained therein, where applicable. The expandable chamber 280 can expand in response, and the valve 258 (e.g., one-way valve) can prevent deflation until such action is controlled. Such expansion can include growth in any one or more of a variety of directions. In the expanded configuration, the deformable region 250 can have a larger size and provide a greater surface area for distributing forces more broadly on the head of the user. The extent of expansion can also be controlled to match the anatomy of the user.

The deformable region 250 can also be deflated by removing fluid from the expandable chamber 280. For example, the valve 258 can be operated manually (e.g., by the user) or electronically (e.g., by the head-mountable device) to allow flow from the expandable chamber 280 through the line 256 to the pump 260. The expandable chamber 280 can be biased to contract from the expanded configuration and return fluid through the line 256.

Figure 11:
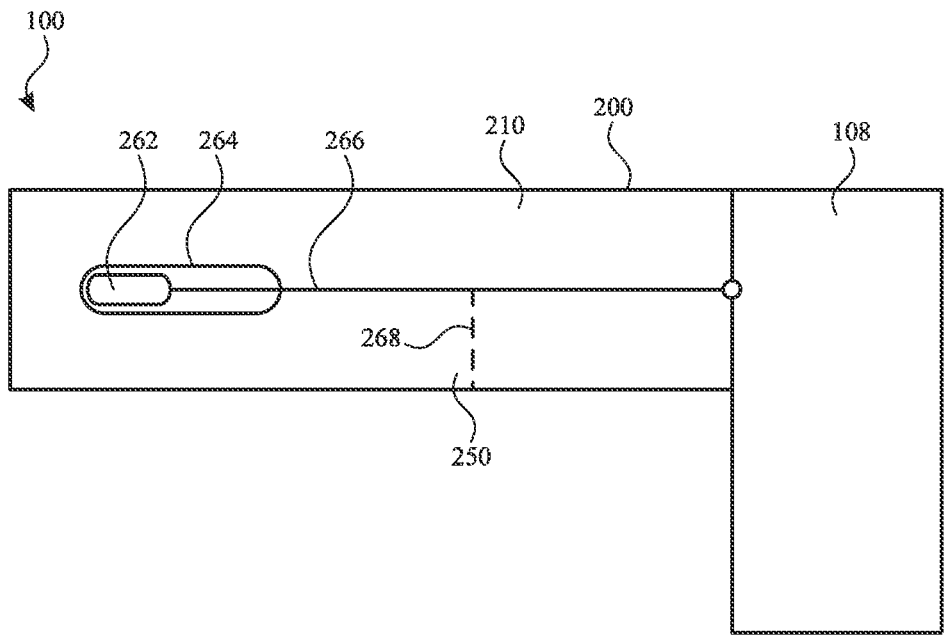
FIG. 11 illustrates a side view of a head-mountable device, according to some embodiments of the present disclosure.
Figure 12:
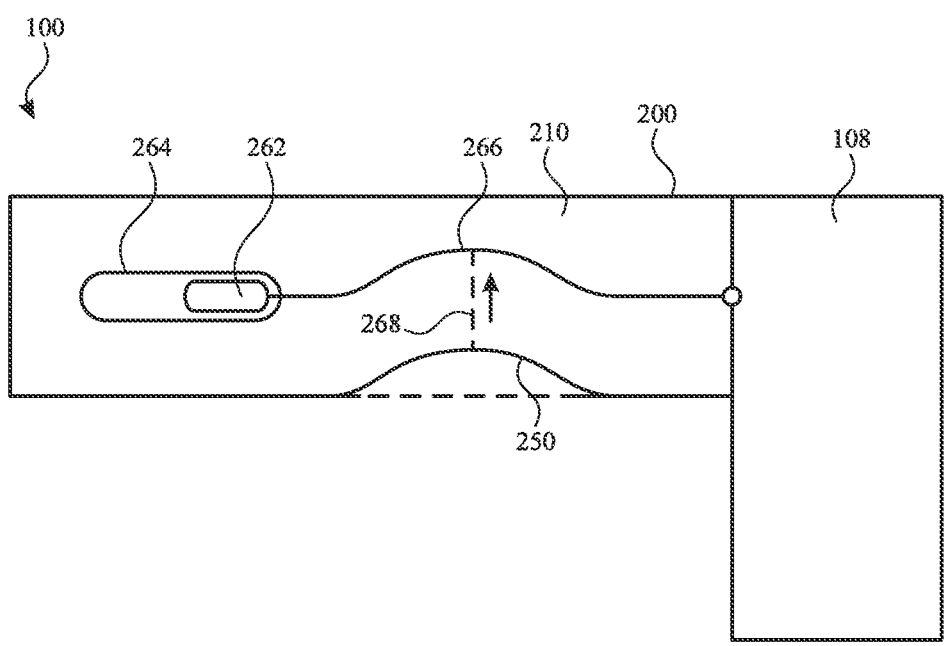
FIG. 12 illustrates a side view of the head-mountable device of FIG. 11 forming a flexible or deformable region, according to some embodiments of the present disclosure.

Referring now to FIGS. 11 and 12, a head securement element can include a biasing element that is adjustable to change the size and/or shape of the head securement element to accommodate a user.

As shown in FIG. 11, the head securement element 200 of the head-mountable device 100 can include a deformable region 250 that interacts with a biasing element 266. The biasing element 266 can be adjusted to cause the deformable region 250 to transition between an extended configuration and a retracted configuration. In the extended configuration, the biasing element 266 urges the deformable region 250 away from the body 210. As such, the deformable region 250 can define an edge of the head securement element 200 that extends a relatively greater distance away from the body 210 (e.g., "downward" or toward the ear of the user).

As shown in FIG. 12, while the biasing element 266 is in the retracted configuration, the biasing element 266 urges (e.g., pulls) the deformable region 250 toward from the body 210. As such, the deformable region 250 can define an edge of the head securement element 200 that extends a relatively greater distance away from the body 210 (e.g., "upward" or away from the ear of the user).

The biasing element 266 can be actuated or otherwise controlled, for example, with an actuation member 262. As shown in FIGS. 11 and 12, the actuation member 262 can be attached to an end of the biasing element 266, which can optionally be attached at an opposite end thereof to a fixed position on the head-mountable device (e.g., the frame 108). In some examples, the actuation member 262 can be slidable in a groove 264 or other guide that directs and/or limits the movement of the actuation member 262. As the actuation member 262 moves to the position illustrated in FIG. 11, the biasing element 266 can be placed in the extended configuration under greater tension. As the actuation member 262 moves to the position illustrated in FIG. 12, the biasing element 266 can be placed in the retracted configuration under less tension. The biasing element 266 can be biased to the retracted configuration such that, when not under tension, the biasing element 266 takes the shape provided by the retracted configuration. The actuation member 262 and/or the groove 264 can provide detents, locks, latches, and/or other mechanisms to retain the biasing element 266 in one or more of certain configurations.

The biasing element 266 can optionally be connected directly to the deformable region 250, for example, with a tension element 268. The tension element 268 can transfer forces from the biasing element 266 (e.g., upon upward movement) to the deformable region 250. Additionally or alternatively, the movement of the biasing element 266 away from the deformable region 250 can allow the deformable region 250 a greater degree of deformability by not obstructing its movements. In such examples, the deformable region 250 can be biased to deflect towards the body 210 when not obstructed (e.g., by the biasing element 266). Additionally or alternatively, the deformable region 250 can respond to applied forces (e.g., by the presence of an ear) to deflect towards the body 210 when not obstructed (e.g., by the biasing element 266).

Figure 13:
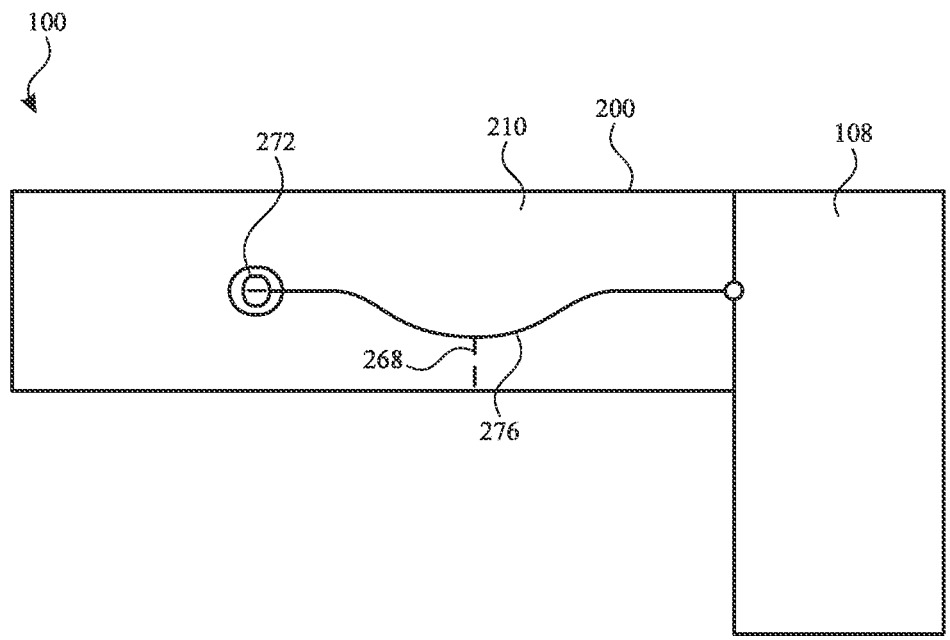
FIG. 13 illustrates a side view of a head-mountable device, according to some embodiments of the present disclosure.
Figure 14:
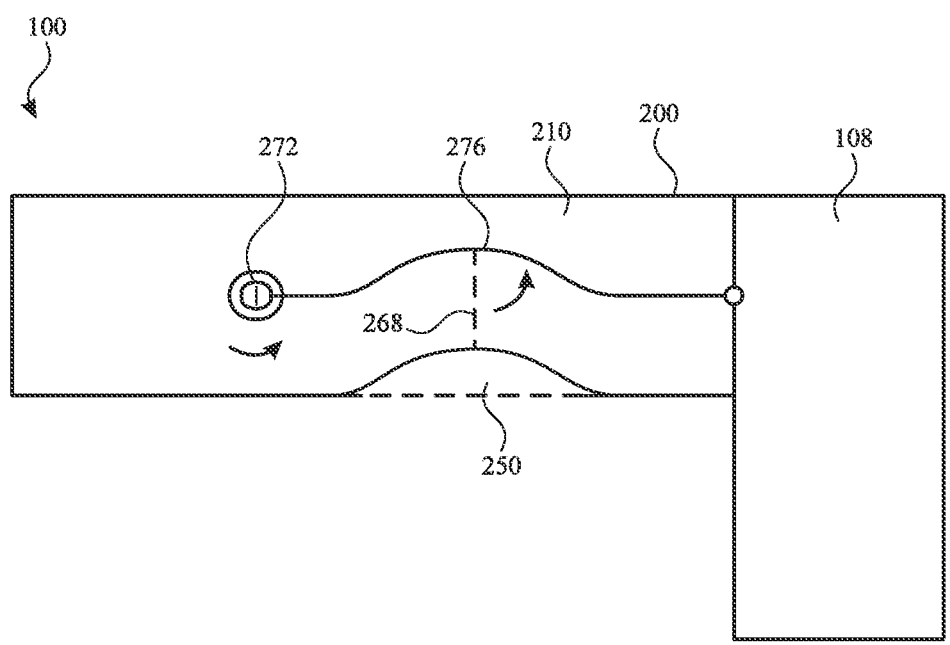
FIG. 14 illustrates a side view of the head-mountable device of FIG. 13 forming a flexible or deformable region, according to some embodiments of the present disclosure.

Referring now to FIGS. 13 and 14, a head securement element can include a biasing element that is adjustable to change the size and/or shape of the head securement element to accommodate a user.

As shown in FIG. 13, the head securement element 200 of the head-mountable device 100 can include a deformable region 250 that interacts with a biasing element 276. The biasing element 276 can be rotated to cause the deformable region 250 to transition between an extended configuration and a retracted configuration. In the extended configuration, the biasing element 276 urges the deformable region 250 away from the body 210. As such, the deformable region 250 can define an edge of the head securement element 200 that extends a relatively greater distance away from the body 210 (e.g., "downward" or toward the ear of the user).

As shown in FIG. 14, while the biasing element 276 is in the retracted configuration, the biasing element 276 urges (e.g., pulls) the deformable region 250 toward from the body 210. As such, the deformable region 250 can define an edge of the head securement element 200 that extends a relatively greater distance away from the body 210 (e.g., "upward" or away from the ear of the user).

The biasing element 276 can be rotated or otherwise controlled, for example, with an actuation member 272. As shown in FIGS. 13 and 14, the actuation member 272 can be attached to an end of the biasing element 276, which can optionally be attached at an opposite end thereof to a fixed position on the head-mountable device (e.g., the frame 108), for example with a rotational degree of freedom. As the actuation member 272 rotates to the orientation illustrated in FIG. 13, the biasing element 276 can be placed in the extended configuration. As the actuation member 272 moves to the orientation illustrated in FIG. 14, the biasing element 276 can be placed in the retracted configuration.

The biasing element 276 can optionally be connected directly to the deformable region 250, for example, with a tension element 268. The tension element 268 can transfer forces from the biasing element 276 (e.g., upon upward movement) to the deformable region 250. Additionally or alternatively, the movement of the biasing element 276 away from the deformable region 250 can allow the deformable region 250 a greater degree of deformability by not obstructing its movements. In such examples, the deformable region 250 can be biased to deflect towards the body 210 when not obstructed (e.g., by the biasing element 276). Additionally or alternatively, the deformable region 250 can respond to applied forces (e.g., by the presence of an ear) to deflect towards the body 210 when not obstructed (e.g., by the biasing element 276).

Referring now to FIGS. 15-18, a head securement element can include a biasing element that is adjustable to change the size, shape, and location of portions of the head securement element to accommodate a user.

Figure 15:
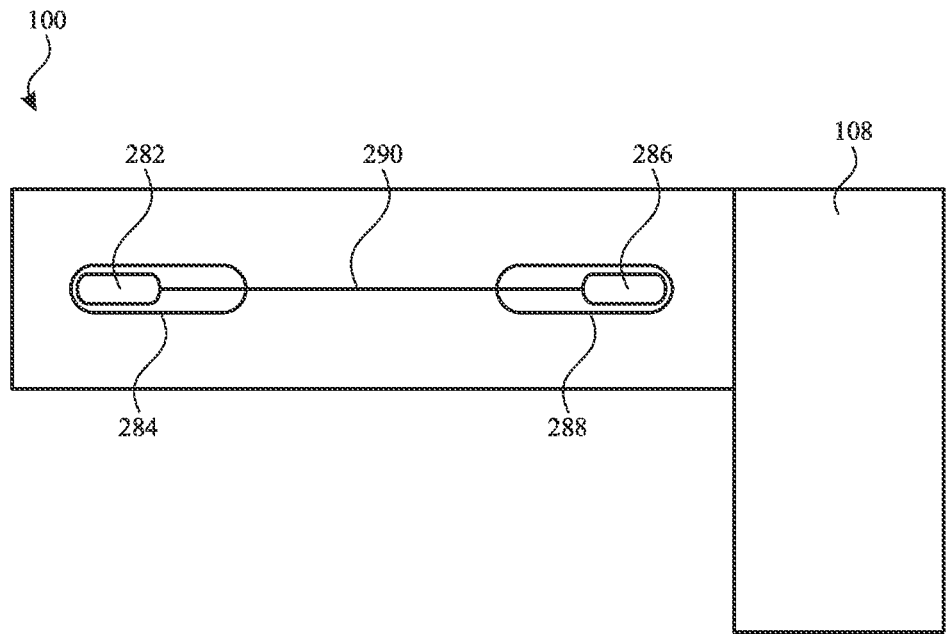
FIG. 15 illustrates a side view of a head-mountable device, according to some embodiments of the present disclosure.

As shown in FIG. 15, a biasing element 290, similar to biasing element 266, can be actuated or otherwise controlled, for example, with actuation members 282 and 286 on opposite ends thereof. Each of the actuation members 282 and 286 can be independently controlled to adjust the biasing element 290 and the deformable region 250 in different ways based on different combinations of configurations.

For example, as further shown in FIG. 15, as the actuation members 282 and 286 move away from each other, the biasing element 290 can be placed in the extended configuration under tension.

Figure 16:
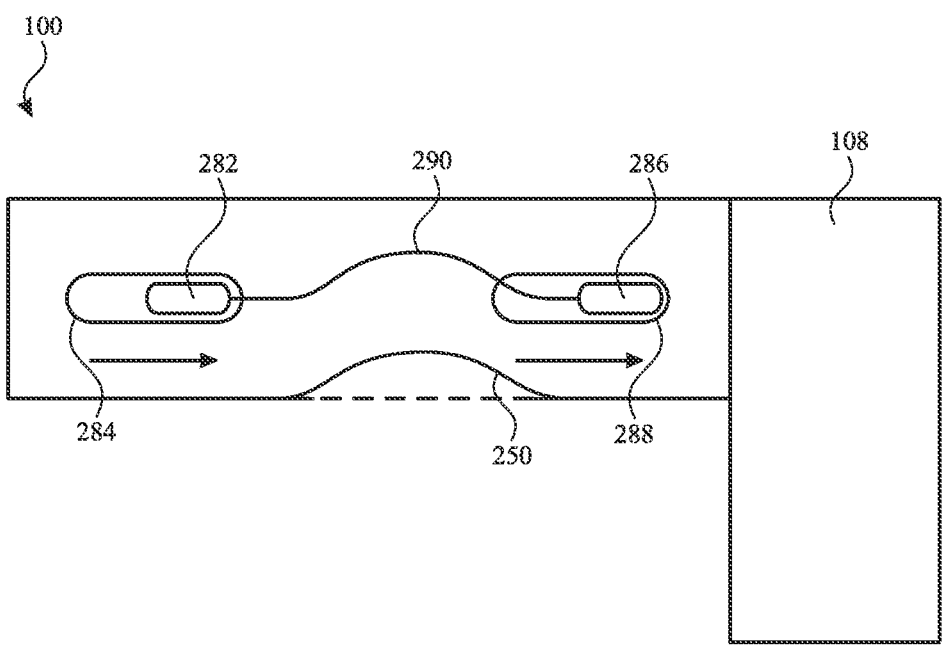
FIG. 16 illustrates a side view of the head-mountable device of FIG. 15 forming a first flexible or deformable region, according to some embodiments of the present disclosure.

As one actuation member 282 moves to the position illustrated in FIG. 16, the biasing element 290 can be placed in one of the retracted configurations under less tension. Because the actuation members 282 and 286 are both in an advanced (e.g., "forward" or toward the frame 108) position, the biasing element 290 can form the deformable region 250 in a retracted configuration in a first position.

Figure 17:
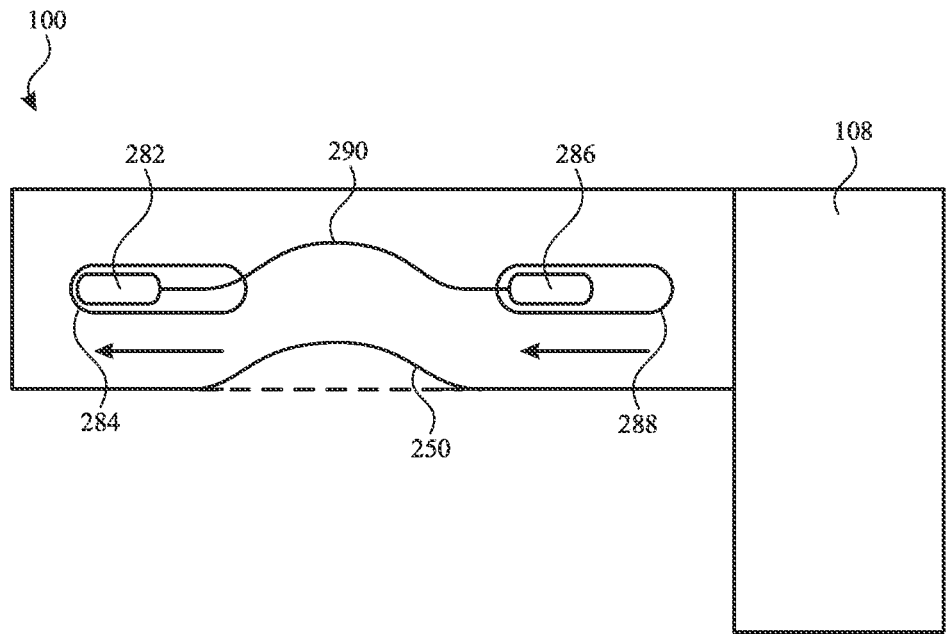
FIG. 17 illustrates a side view of the head-mountable device of FIG. 15 forming a second flexible or deformable region, according to some embodiments of the present disclosure.

As both actuation members 282 and 286 move to the positions illustrated in FIG. 17, the biasing element 290 can be placed in another retracted configuration under less tension. Because the actuation members 282 and 286 are both in a retracted (e.g., "rearward" or away from the frame 108) position, the biasing element 290 can form the deformable region 250 in a retracted configuration in a second position, different than the first position. This can help accommodate the ear when it is at one or the other position, to maximize comfort for the user.

Figure 18:
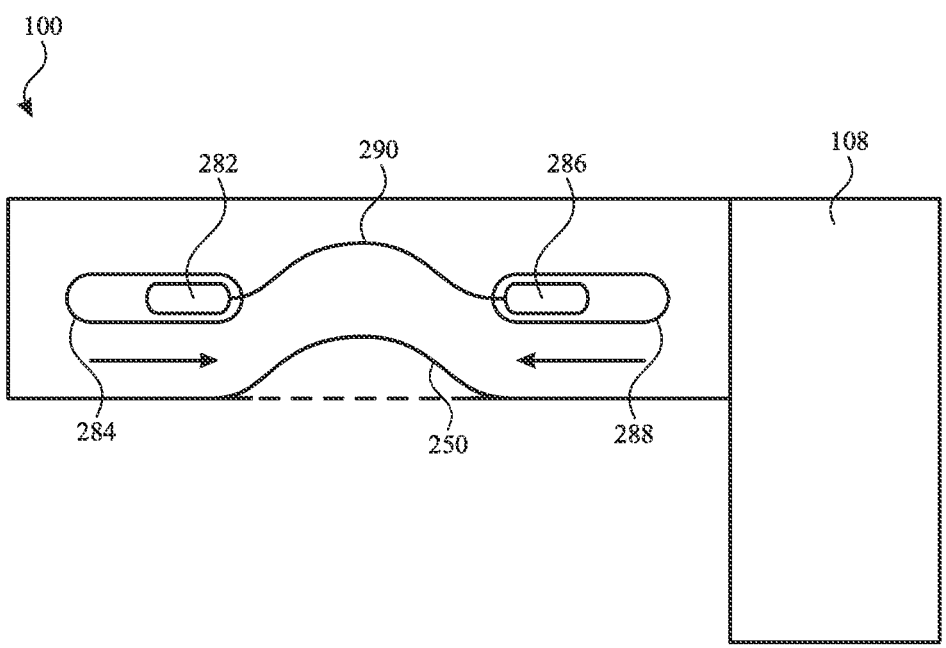
FIG. 18 illustrates a side view of the head-mountable device of FIG. 15 forming a third flexible or deformable region, according to some embodiments of the present disclosure.

As both actuation members 282 and 286 move toward each other and to the positions illustrated in FIG. 18, the biasing element 290 can be placed in another retracted configuration under even less tension. In such a configuration, the depth of the recess formed by the deformable region 250 can be greater, thereby accommodating an ear that is higher on the head than with other users.

The actuation members 282 and 286 can move within corresponding grooves 284 and 288 other guides that direct and/or limit the movement of the actuation members 282 and 286. The actuation members 282 and 286 and/or the grooves 284 and 288 can provide detents, locks, latches, and/or other mechanisms to retain the biasing element 290 in one or more of certain configurations.

It will be understood that such adjustments can be controlled by a user and/or by the head-mountable device. Where controlled by the head-mountable device, the operations can be performed in response to sensed conditions. For example, a sensor can detect forces applied to the user and respond to alleviate forces above a threshold.

Figure 19:
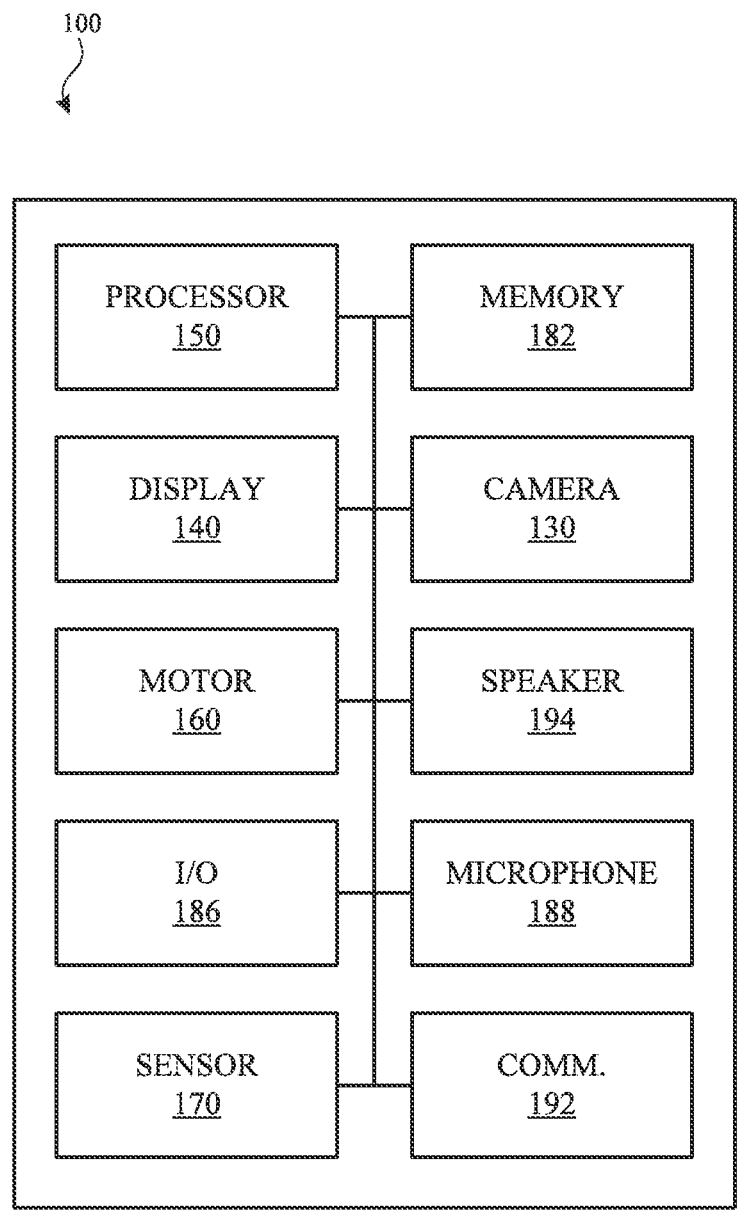
FIG. 19 illustrates a block diagram of a head-mountable device, in accordance with some embodiments of the present disclosure.

Referring now to FIG. 19, components of the head-mountable device can be operably connected to provide the performance described herein. FIG. 19 shows a simplified block diagram of an illustrative head-mountable device 100 in accordance with one embodiment of the invention. It will be appreciated that components described herein can be provided on one, some, or all of an HMD module, a face engagement module, and/or a head securement element. It will be understood that additional components, different components, or fewer components than those illustrated may be utilized within the scope of the subject disclosure.

As shown in FIG. 19, the head-mountable device 100 can include a processor 150 (e.g., control circuitry) with one or more processing units that include or are configured to access a memory 182 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display element 140 for close up viewing. The optical subassembly can include one or more lenses, mirrors, or other optical devices.

The head-mountable device 100 can include adjustment control components, such as a motor 160, an actuator, and the like for moving components to a desired relative position, orientation, and/or configuration as described herein.

The head-mountable device 100 can include one or more sensors 170, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image-based content of the outside world.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include the speakers 194 as described herein. The speakers 194 can be operably connected to the processor 150 for control of speaker output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery or other power source, which can charge and/or power components of the head-mountable device 100. The battery can also charge and/or power components connected to the head-mountable device 100.

Accordingly, embodiments of the present disclosure provide a head-mountable device with a head securement element that allows a user to adjust how the head securement element fits near the ears of the user. Examples of adjustment mechanisms described herein allow a user to control the size, shape, flexibility, and/or position of certain regions of the head securement element with respect to the ears of the user. Accordingly, the user can select a configuration that distributes forces evenly, maximizes comfort, and allows the user to enjoy the head-mountable device for longer durations of time.

Various examples of aspects of the disclosure are described below as clauses for convenience. These are provided as examples, and do not limit the subject technology.

Clause A: a head-mountable device comprising: a frame; and a display element supported by the frame; a head securement element comprising: a body extending from the frame; a deformable region configured to be adjacent to an ear of a user while the head-mountable device is worn on a head of the user; a biasing element extending through the body and being configured to transition between: an extended configuration, in which the biasing element urges the deformable region away from the body; and a retracted configuration, in which the biasing element urges the deformable region toward the body.

Clause B: a head-mountable device comprising: a frame; a display element supported by the frame; and a head securement element comprising: a body extending from the frame; a support strap coupled to the frame at first locations on opposing sides of the frame; a tilt strap coupled to the frame at second locations on the opposing sides of the frame; and a deformable region defining an edge of the body and being adjacent to an intersection at which the tilt strap crosses the support strap, wherein the deformable region between the edge and the intersection is more deformable than a portion of the body between the support strap and the tilt strap.

Clause C: a head-mountable device comprising: a frame; a display element supported by the frame; and a head securement element comprising: a body extending from the frame; an expandable chamber defining an edge of the body; and a pump configured to transition the expandable chamber between: a deflated configuration, in which the expandable chamber has a first size; and an inflated configuration, in which the expandable chamber has a second size, larger than the first size.

One or more of the above clauses can include one or more of the features described below. It is noted that any of the following clauses may be combined in any combination with each other, and placed into a respective independent clause, e.g., clause A, B, or C.

Clause 1: a camera configured to capture an image for output on the display element; a speaker; a microphone; and a sensor.

Clause 2: the head securement element further comprises an actuation member configured to actuate the biasing element from the extended configuration to the retracted configuration.

Clause 3: the head securement element further comprises a groove, and the actuation member is slidably disposed in the groove.

Clause 4: the actuation member is a first actuation member at a first end of the biasing element; and the head securement element further comprises a second actuation member at a second end of the biasing element.

Clause 5: the first actuation member and the second actuation member are independently adjustable to control a shape and position of the biasing element.

Clause 6: the groove is a first groove; and the head securement element further comprises a second groove, the second actuation member being slidably disposed in the groove.

Clause 7: the biasing element is biased to the retracted configuration.

Clause 8: the body is of a material that is harder than the deformable region.

Clause 9: the biasing element is connected to the deformable region by a tension element.

Clause 10: the body extends from both of opposing sides of the frame.

Clause 11: the head securement element further comprises: a support strap tensioning element configured to adjust tension of the support strap; and a tilt strap tensioning element configured to adjust tension of the tilt strap.

Clause 12: the support strap tensioning element is operable to adjust upward forces applied at the first locations; and the tilt strap tensioning element is operable to adjust downward forces applied at the second locations.

Clause 13: the support strap tensioning element is configured to adjust the tension of the support strap by changing a length of the support strap between the first locations; and the tilt strap tensioning element is configured to adjust the tension of the support strap by changing a length of the tilt strap between the second locations.

Clause 14: the support strap and the tilt strap are disposed within the body.

Clause 15: the pump is operable to transition the expandable chamber by controlling flow of fluid between the pump and the expandable chamber.

Clause 16: the pump is operable to transition the expandable chamber to the inflated configuration by actuating the pump with an applied force from a user.

Clause 17: the pump is connected to the expandable chamber by a line that includes a valve, wherein the valve is operable to transition the expandable chamber to the deflated configuration by actuating the valve with an applied force from a user.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a frame; and
   a display element supported by the frame;
   a head securement element comprising:
      a body extending from the frame;
      a deformable region configured to be adjacent to an ear of a user while the head-mountable device is worn on a head of the user;
      a biasing element extending through the body and being configured to transition between:
         an extended configuration, in which the biasing element urges the deformable region away from the body; and
         a retracted configuration, in which the biasing element urges the deformable region toward the body.

2. The head-mountable device of claim 1, further comprising:
   a camera configured to capture an image for output on the display element;
   a speaker;
   a microphone; and
   a sensor.

3. The head-mountable device of claim 1, wherein the head securement element further comprises an actuation member configured to actuate the biasing element from the extended configuration to the retracted configuration.

4. The head-mountable device of claim 3, wherein the head securement element further comprises a groove, and the actuation member is slidably disposed in the groove.

5. The head-mountable device of claim 4, wherein:
the actuation member is a first actuation member at a first end of the biasing element; and
the head securement element further comprises a second actuation member at a second end of the biasing element.

6. The head-mountable device of claim 5, wherein the first actuation member and the second actuation member are independently adjustable to control a shape and position of the biasing element.

7. The head-mountable device of claim 5, wherein:
the groove is a first groove; and
the head securement element further comprises a second groove, the second actuation member being slidably disposed in the groove.

8. The head-mountable device of claim 1, wherein the biasing element is biased to the retracted configuration.

9. The head-mountable device of claim 1, wherein the body is of a material that is harder than the deformable region.

10. The head-mountable device of claim 1, wherein the biasing element is connected to the deformable region by a tension element.

11. The head-mountable device of claim 1, wherein the body extends from both of opposing sides of the frame.

12. A head-mountable device comprising:
a frame;
a display element supported by the frame; and
a head securement element comprising:
   a body extending from the frame;
   a support strap coupled to the frame at first locations on opposing sides of the frame;
   a tilt strap coupled to the frame at second locations on the opposing sides of the frame; and
   a deformable region defining an edge of the body and being adjacent to an intersection at which the tilt strap crosses the support strap, wherein the deformable region between the edge and the intersection is more deformable than a portion of the body between the support strap and the tilt strap.

13. The head-mountable device of claim 12, wherein the head securement element further comprises:
a support strap tensioning element configured to adjust tension of the support strap; and
a tilt strap tensioning element configured to adjust tension of the tilt strap.

14. The head-mountable device of claim 13, wherein:
the support strap tensioning element is operable to adjust upward forces applied at the first locations; and
the tilt strap tensioning element is operable to adjust downward forces applied at the second locations.

15. The head-mountable device of claim 13, wherein:
the support strap tensioning element is configured to adjust the tension of the support strap by changing a length of the support strap between the first locations; and
the tilt strap tensioning element is configured to adjust the tension of the support strap by changing a length of the tilt strap between the second locations.

16. The head-mountable device of claim 12, wherein the support strap and the tilt strap are disposed within the body.

17. A head-mountable device comprising:
a frame;
a display element supported by the frame; and
a head securement element comprising:
   a body extending from the frame;
   an expandable chamber defining an edge of the body; and
   a pump configured to transition the expandable chamber between:
      a deflated configuration, in which the expandable chamber has a first size; and
      an inflated configuration, in which the expandable chamber has a second size, larger than the first size.

18. The head-mountable device of claim 17, wherein the pump is operable to transition the expandable chamber by controlling flow of fluid between the pump and the expandable chamber.

19. The head-mountable device of claim 17, wherein the pump is operable to transition the expandable chamber to the inflated configuration by actuating the pump with an applied force from a user.

20. The head-mountable device of claim 17, wherein the pump is connected to the expandable chamber by a line that includes a valve, wherein the valve is operable to transition the expandable chamber to the deflated configuration by actuating the valve with an applied force from a user.

* * * * *

UNITED STATES PATENT AND TRADEMARK OFFICE
CERTIFICATE OF CORRECTION

| | | |
|---|---|---|
| PATENT NO. | : 12,248,152 B1 | Page 1 of 1 |
| APPLICATION NO. | : 17/740199 | |
| DATED | : March 11, 2025 | |
| INVENTOR(S) | : Paul X. Wang et al. | |

It is certified that error appears in the above-identified patent and that said Letters Patent is hereby corrected as shown below:

On the Title Page

Item (72), Line 1, Replace "Paul X Wang" with --Paul X. Wang--.

Signed and Sealed this
Seventeenth Day of June, 2025

Coke Morgan Stewart
*Acting Director of the United States Patent and Trademark Office*